(12) United States Patent
Lee

(10) Patent No.: US 7,792,213 B1
(45) Date of Patent: Sep. 7, 2010

(54) MINIMUM IQ VALUE LIMITING

(75) Inventor: Wayne S. Lee, San Mateo, CA (US)

(73) Assignee: Panasonic Corporation, Osaka (JP)

( * ) Notice: Subject to any disclaimer, the term of this patent is extended or adjusted under 35 U.S.C. 154(b) by 662 days.

(21) Appl. No.: 11/823,053

(22) Filed: Jun. 25, 2007

(51) Int. Cl.
*H04K 1/02* (2006.01)
(52) U.S. Cl. .................................. 375/297; 330/124 R
(58) Field of Classification Search .................. 330/123, 330/149; 375/297, 371; 455/95, 226.1
See application file for complete search history.

(56) References Cited

U.S. PATENT DOCUMENTS

| | | | |
|---|---|---|---|
| 6,242,975 B1 * | 6/2001 | Eidson et al. ........... 330/124 R |
| 6,947,710 B2 * | 9/2005 | Samuels et al. ................ 455/95 |
| 2004/0218706 A1 * | 11/2004 | Bougeard et al. ........... 375/371 |
| 2005/0260962 A1 * | 11/2005 | Nazrul et al. ............ 455/226.1 |
| 2007/0014382 A1 * | 1/2007 | Shakeshaft et al. .......... 375/297 |

* cited by examiner

*Primary Examiner*—David C Payne
*Assistant Examiner*—Leon-Viet Q Nguyen

(57) ABSTRACT

Embodiments of a multi-point push-out method are disclosed for a more accurate adjustment of minimum IQ values in order to maintain better continuity in the IQ trajectory for sampled IQ values near the origin. IQ trajectories near the origin are limited to a minimum IQ value by determining a specific scaling factor according to a position of the sampled IQ value relative to the origin and/or to the minimum IQ value. The minimum IQ value is also referred to as a threshold boundary value.

21 Claims, 7 Drawing Sheets

MINIMUM IQ VALUE LIMITING

FIELD OF THE INVENTION

The present invention relates to modulating signals. More particularly, the present invention relates to adjusting sampled IQ values near the origin.

BACKGROUND OF THE INVENTION

An IQ modulator shapes and samples an input signal to generate a series of discrete sampled values. Each sampled value includes an in-phase (I) component and a quadrature (Q) component, collectively referred to as a sampled IQ value. An IQ trajectory is a path derived from discrete sampled IQ values sampled from the input signal. The sampled IQ values are plotted on an IQ graph, with the origin (0,0) defined as the zero value for both the in-phase (I) component and the quadrature (Q) component. The sampling rate determines the number of discrete sampled IQ values. The higher the sampling rate, the more points that define the IQ trajectory. The IQ trajectory is ideally a smooth curve representing an infinite number of discrete sampled IQ values. In practice, there is always some finite number of sampled values, as defined by the sampling rate.

In hardware limitations, an IQ trajectory near the origin generates distortion in a corresponding output signal. Corrective signal processing of the sampled IQ values near the origin can improve the performance of the signal processing circuit. Conventional methodologies re-assign sampled IQ values that are near the origin to either a fixed distance away from the origin or to a default IQ value. In particular, sampled IQ values are compared to a minimum threshold value, and those sampled IQ values that are lower than the minimum threshold value are assigned to a minimum circular boundary about the origin or to a new default IQ value. In terms of the IQ trajectory and the corresponding IQ plot, there is one default IQ value associated with each quadrant of the IQ plot. The minimum threshold value defines a threshold region, which is typically the form of a box centered about the origin in the IQ plot. In this case, the threshold region is defined by the coordinates (+/−x, +/−x) on the IQ plot. The default IQ value for each quadrant is defined along the minimum threshold value at 45, 135, 225, and 315 degrees measured from the positive I-axis. These locations correspond to the corners of the threshold region.

FIGS. 1A and 1B illustrate an exemplary IQ trajectory and conventional approaches for revaluing IQ values near the origin. An IQ trajectory 10 is comprised of multiple sampled IQ values including a sampled IQ value 12, a sampled IQ value 14, a sampled IQ value 16, a sampled IQ value 18, and a sampled IQ value 20. In FIG. 1A, a minimum IQ value is defined by the threshold boundary value 24. The threshold boundary value 24 forms an outer perimeter of a threshold region centered about the origin 22. In simplified applications, any sampled IQ value that falls within the threshold region, such as the sampled IQ value 16, is to be revalued to a default IQ value. This default IQ value is conventionally assigned to be at the maximum threshold distance from the origin. A default IQ value is assigned for each quadrant within the IQ plot. In the configuration shown in FIG. 1A, the maximum threshold distance for the first quadrant is located at the point 26. Therefore, the default IQ value for the sampled IQ value 16 is the IQ value at the point 26. The maximum threshold distance for each quadrant is defined along the threshold boundary value 24 at 45, 135, 225, and 315 degrees measured from the positive I-axis. These locations correspond to the corners of the threshold region. Conventionally, only one default IQ value is selected per quadrant, which in this example is the IQ value 26. As such, any sampled IQ value that is less than the threshold boundary value 24, and therefore resides within the threshold region, is reassigned the default IQ value for the corresponding quadrant. For each quadrant in the threshold region, the default IQ value is the same regardless of where within the threshold region quadrant the sample IQ value is located. In general, this approach is referred to as a single-point push-out method, since for each quadrant, all sampled IQ values within the threshold region are "pushed-out" to the default IQ point.

In FIG. 1B, a minimum IQ value is defined by the minimum circular boundary 23. The minimum circular boundary 23 forms a perimeter of a threshold region centered about the origin 22. In simplified applications, any sampled IQ value that falls within the threshold region, such as the sampled IQ value 16, is to be revalued to a default IQ value. In this configuration, the default IQ value is a fixed distance away from the origin on the minimum circular boundary 23. Therefore, the default IQ value for the sampled IQ value 16 is the IQ value at the point 25.

Although the simplified approach of reassigning sampled IQ values near the origin aids in reducing distortion, using a fixed default IQ value leads to discontinuities in the IQ trajectory. Compare the IQ trajectory 10 in FIG. 1A with the default IQ value 26 and in FIG. 1B with the default IQ value 25. Such discontinuities result in transients in the frequency response.

SUMMARY OF THE INVENTION

Embodiments of a multi-point push-out method are disclosed for a more accurate adjustment of minimum IQ values in order to maintain better continuity in the IQ trajectory for sampled IQ values near the origin. IQ trajectories near the origin are limited to a minimum IQ value by determining a specific scaling factor according to a position of the sampled IQ value relative to the origin and/or to the minimum IQ value. The minimum IQ value is also referred to as a threshold boundary value.

In an aspect, a method comprises generating a plurality of discrete sampled IQ values based on an input signal, wherein each sampled IQ value includes an in-phase component and a quadrature component, comparing each sampled IQ value to a defined minimum IQ value, for each specific sampled IQ value that is less than the minimum IQ value, determining a specific scaling factor to be applied to the specific sampled IQ value, wherein the specific scaling factor is determined according to a relative difference between the specific sampled IQ value and the minimum IQ value and applying the specific IQ scaling factor to the specific sampled IQ value, thereby generating a scaled IQ value, wherein the scaled IQ value exceeds the minimum IQ value, further wherein the specific IQ scaling factor is applied to the in-phase component and the quadrature component of the specific sampled IQ value. In some embodiments, the determined scaling factor is selected from a set of scaling factors, wherein each scaling factor in the set of scaling factors is associated with a range of distances from the minimum IQ value. Each scaling factor is related to another scaling factor in the set by a power of two. The method further comprises generating an IQ trajectory according to each scaled IQ value and each sampled IQ value that is equal to or greater than the minimum IQ value. In some embodiments, the input signal is sampled at an over-sampling rate. In some embodiments, the input signal is sampled at data rate.

In another aspect, a method comprises defining a threshold boundary value centered about a zero IQ value, thereby forming a threshold region, mapping one or more sub-threshold regions within the threshold region, each sub-threshold region is centered about the zero IQ value thereby forming a plurality of adjacent banded regions extending from the zero IQ value to the threshold boundary value, wherein each banded region is associated with a specific scaling factor, generating a plurality of discrete sampled IQ values based on an input signal, comparing each sampled IQ value to the threshold boundary value, for each sampled value that is less than the threshold boundary value, mapping the sampled IQ value to a corresponding banded region and multiplying the sampled IQ value by the specific scaling factor associated with the corresponding banded region, thereby forming a scaled IQ value. In some embodiments, each scaled IQ value is equal to or greater than the threshold boundary value and less than a maximum scaled value. Each sub-threshold region is defined by a sub-threshold value, and each sub-threshold value and the threshold boundary value are related by a power of two. In some embodiments, a first scaling factor associated with a first banded region is less than a second scaling factor associated with a second banded region if the first banded region is further away from the zero IQ value than the second banded region. In some embodiments, the threshold region forms a square region centered about the zero IQ value. Each sub-threshold region forms a square region centered about the zero IQ value. The method further comprises generating an IQ trajectory according to each scaled IQ value and each sampled IQ value that is equal to or greater than the threshold boundary value. In some embodiments, the input signal is sampled at an over-sampling rate. In some embodiments, the input signal is sampled at data rate.

In still another aspect, a machine comprises an IQ limiting module configured to compare a sampled IQ value based on an input signal, to a defined minimum IQ value, to determine a specific scaling factor to be applied to the specific sampled IQ value for each specific sampled IQ value that is less than the minimum IQ value, wherein the specific scaling factor is determined according to a relative difference between the specific sampled IQ value and the minimum IQ value, and to apply the specific IQ scaling factor to the specific sampled IQ value, thereby generating a scaled IQ value, wherein the scaled IQ value exceeds the minimum IQ value, further wherein the specific IQ scaling factor is applied to the in-phase component and the quadrature component of the specific sampled IQ value. In some embodiments, the IQ limiting module is configured to select the scaling factor is from a set of scaling factors, wherein each scaling factor in the set of scaling factors is associated with a range of distances from the minimum IQ value. Each scaling factor is related to another scaling factor in the set by a power of two. In some embodiments, the IQ limiting module is further configured to generate an IQ trajectory according to each scaled IQ value and each sampled IQ value that is equal to or greater than the minimum IQ value. In some embodiments, the IQ modulator is configured to sample the input signal at an over-sampling rate.

In another aspect, a machine comprises an IQ limiting module coupled to the IQ modulator and configured to compare a sampled IQ value based on an input signal, to a defined minimum IQ value, to determine a specific scaling factor to be applied to the specific sampled IQ value for each specific sampled IQ value that is less than the minimum IQ value, wherein the specific scaling factor is determined according to a relative difference between the specific sampled IQ value and the minimum IQ value, and to apply the specific IQ scaling factor to the specific sampled IQ value, thereby generating a scaled IQ value, wherein the scaled IQ value exceeds the minimum IQ value, further wherein the specific IQ scaling factor is applied to the in-phase component and the quadrature component of the specific sampled IQ value, a polar converter to convert each scaled IQ value and each to a corresponding amplitude value and a corresponding phase value, a voltage-controlled oscillator coupled to the polar converter and configured to output a frequency response in response to the phase value, a power amplifier coupled to the voltage controlled oscillator and the polar converter, wherein the power amplifier is configured to output an amplified signal in response to the frequency response and the amplitude response and an antenna coupled to the power amplifier and configured to transmit the amplified signal.

BRIEF DESCRIPTION OF THE SEVERAL VIEWS OF THE DRAWINGS

The present invention is described relative to the several views of the drawings. Where appropriate and only where identical elements are disclosed and shown in more than one drawing, the same reference numeral will be used to represent such identical elements.

DETAILED DESCRIPTION

Figure 1A:
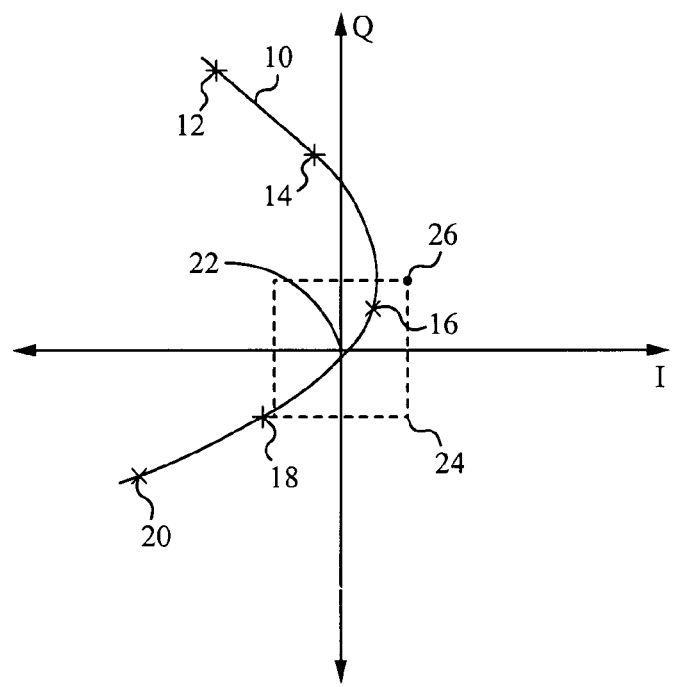
FIGS. 1A and 1B illustrate an exemplary IQ trajectory and conventional approaches for revaluing IQ values near the origin.
Figure 1B:
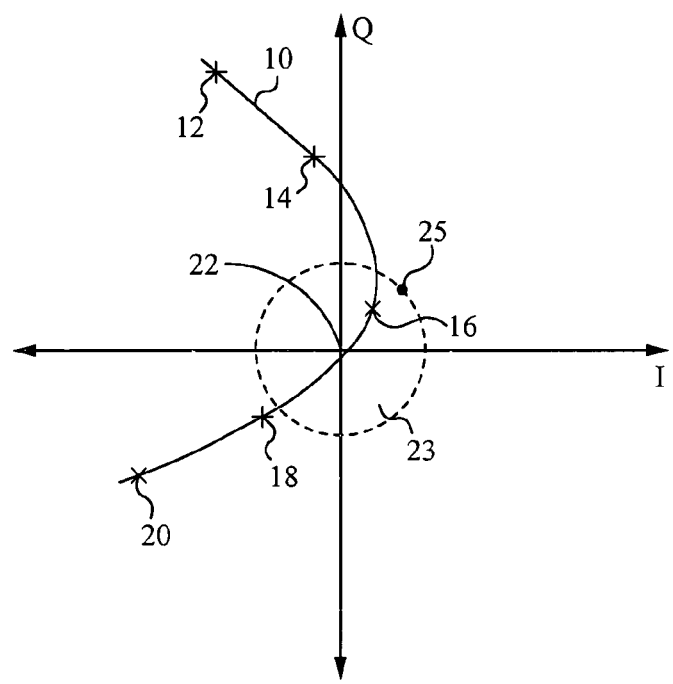

Embodiments of the present invention are directed to a multi-point push-out method to re-value sampled IQ points near the origin. Those of ordinary skill in the art will realize that the following detailed description of the present invention is illustrative only and is not intended to be in any way limiting. Other embodiments of the present invention will readily suggest themselves to such skilled persons having the benefit of this disclosure.

Reference will now be made in detail to implementations of the present invention as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

The multi-point push-out method determines a specific scaling factor to be applied. The specific scaling factor is determined according to a relative difference between the origin and the sampled IQ value. A threshold boundary value is defined, thereby defining a threshold region centered about the origin within which any sampled IQ value is deemed to be "too near" to the origin. The threshold region is partitioned into adjacent banded regions that expand from the origin to the threshold boundary value. Each banded region is bounded by a sub-threshold boundary value. The outermost banded region is bound on an outer edge by the threshold boundary value. A specific scaling factor is associated with each banded region. Any sampled IQ value that falls within a given banded region is scaled by the specific scaling factor associated with that given banded region. The specific scaling factor is applied to both the I-component and the Q-component of the sampled IQ value, thereby generating a scaled IQ value that is greater than the threshold boundary value. Since both the I-component and the Q-component are scaled, a vector from the origin to the scaled IQ value has the same direction and as a vector from the origin to the sampled IQ value to which the scaling factor is applied. The vector magnitude of the scaled IQ value is a multiple of the vector magnitude of the sampled IQ value. This provides the "multi-point" aspect of the method since a sampled IQ value that is scaled results in a scaled IQ value that can be located in any one of multiple points depending on the original vector of the sampled IQ value.

A first banded region that is closer to the origin than a second banded region has a first scaling factor that is larger than a second scaling factor of the second banded region. The specific scaling factors are determined such that the scaled IQ value is greater than or equal to the threshold boundary value and less than a maximum scaled value. The region bounded by the maximum scaled value and the threshold boundary value is referred to as a scaled region. All scaled IQ values fall within the scaled region.

In some embodiments, the threshold boundary value is defined by the boundary coordinates (+/−x, +/−x) on the corresponding IQ plot. In this case, the threshold boundary value forms a square threshold region centered around the origin, or zero IQ value. The sub-threshold boundary values are defined by continually dividing the threshold boundary value by powers of two. For example, a first sub-threshold boundary value is defined by the boundary coordinates (+/−x/2, +/−x/2), a second sub-threshold boundary value is defined by the boundary coordinates (+/−x/4, +/−x/4), and so on. In this embodiment, the maximum scaled value forms a square centered about the origin, and the maximum scaled value is defined by multiplying the threshold boundary value by two. In the embodiments described below, two sub-threshold boundary values are defined. It is understood that the multi-point push-out method can be implemented using more or less than two sub-threshold boundary values. It is also understood that the sub-threshold boundary values and the maximum scaled value can be defined according to other relationships than the power of two method described above. The sub-threshold boundary values can also be independently assigned, with no specific relationship to the threshold boundary value or any of the other sub-threshold boundary values other than to set boundaries for banded regions as described herein. The maximum scaled value can also be independently assigned.

Figure 2:
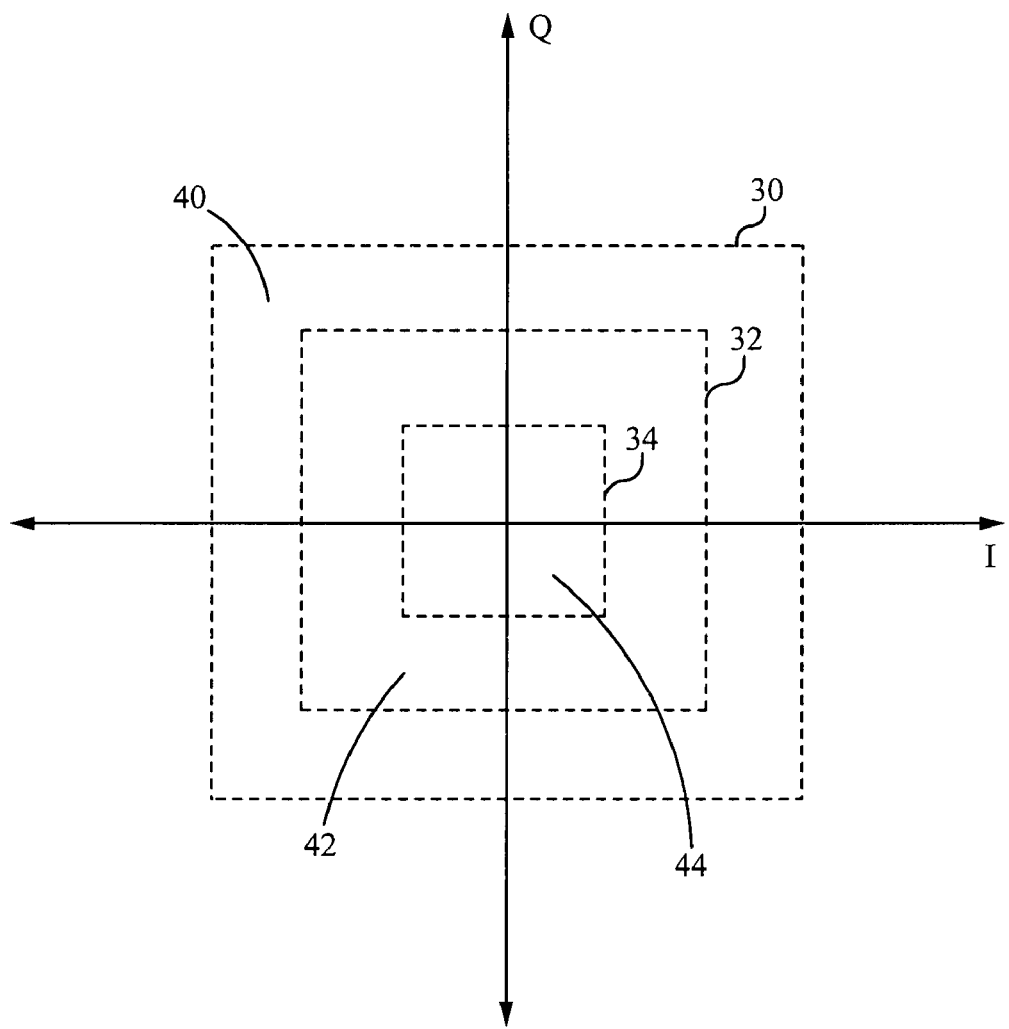
FIG. 2 illustrates an exemplary configuration of a threshold region including three banded regions.

FIG. 2 illustrates an exemplary configuration of a threshold region including three banded regions. A threshold boundary value 30 forms a square threshold region centered around the origin. The threshold region is partitioned into banded regions by two sub-threshold boundary values. A first sub-threshold boundary value 34 forms a banded region 44. A second sub-threshold boundary value 32 forms a banded region 42. The banded region 42 is bound by the first sub-threshold boundary value 34 and the second sub-threshold boundary value 32. A banded region 40 is bound by the second sub-threshold boundary value 32 and the threshold boundary value 30. In this configuration, the banded region 40 includes all IQ values less than the threshold boundary value 30 and greater than or equal to the second sub-threshold boundary value 32. The banded region 42 includes all IQ values less than the second sub-threshold boundary value 32 and greater than or equal to the first sub-threshold boundary value 34. The banded region 44 includes all IQ values less than the first sub-threshold boundary value 34. Each banded region 40, 42, 44 is associated with a specific scaling factor. For example, the scaling factor associated with the banded region 40 is a scaling factor g, the scaling factor associated with the banded region 42 is a scaling factor g', and the scaling factor associated with the banded region 44 is a scaling factor g".

In some embodiments, the sub-threshold boundary values and the threshold boundary value are related by powers of two. For example, if the sub-threshold boundary value 34 is represented by a single unit, then the sub-threshold boundary value 32 is represented by two units, and the threshold boundary value 30 is represented by four units. In this configuration, the scaling factors associated with each banded region are also related by powers of two. Specifically, the scaling factor g associated with the banded region 40 is two, the scaling factor g' associated with the banded region 42 is four, and the scaling factor g" associated with the banded region 44 is eight. The powers of two design is complimentary with binary nature of digital design. As such, a simple bit-shifting operation is used to perform the scaling function.

There are two considerations for each sampled IQ value that is less than the threshold boundary value, which direction to "push" the sampled IQ value and by how much. Since both the I-component and the Q-component of the sampled IQ value are multiplied by the scaling factor, the direction that the sampled IQ value is moved is along the same vector direction as the sampled IQ value. The amount by which the sampled IQ value is moved along this vector direction is determined by the corresponding banded region within the threshold region.

Figure 3:
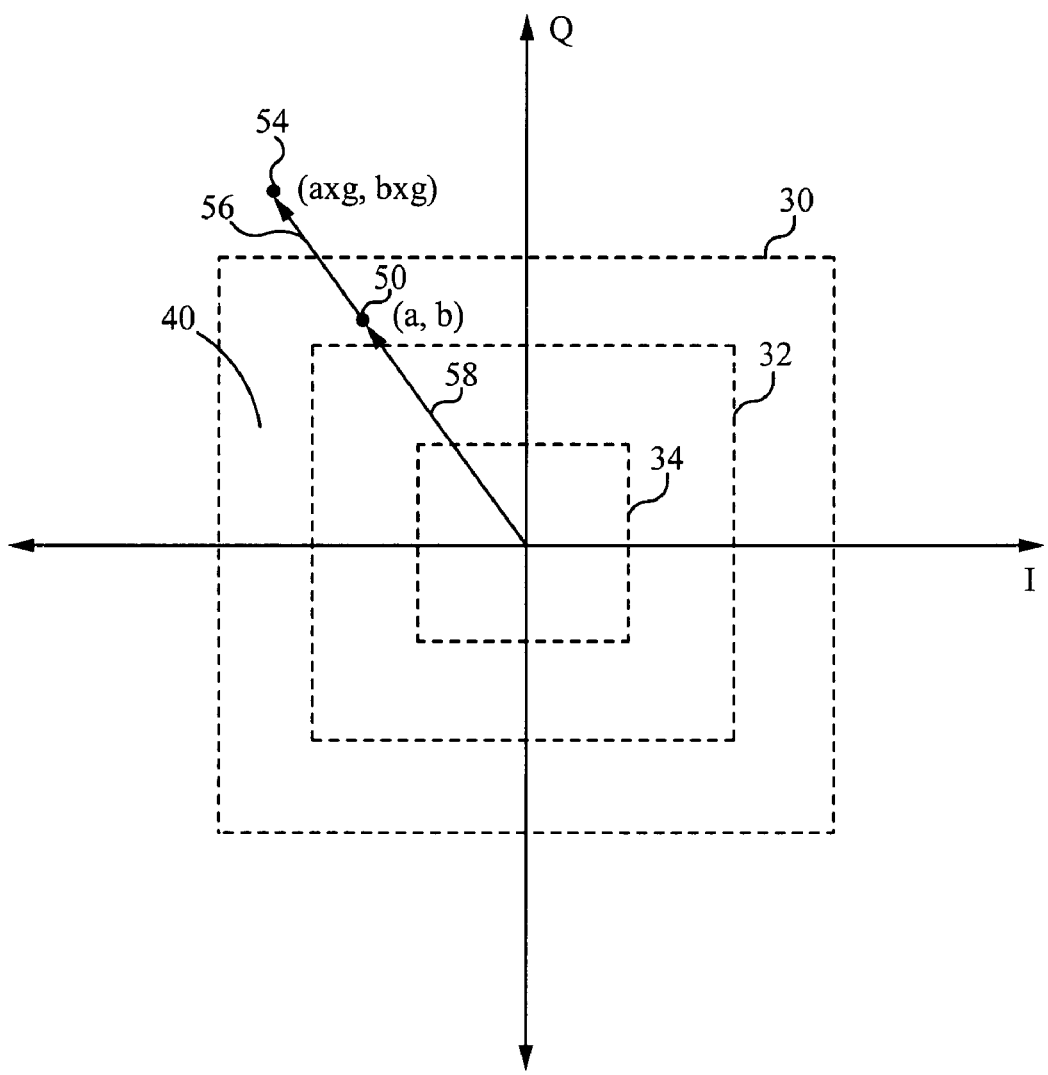
FIG. 3 illustrates an exemplary implementation of the threshold region including three banded regions from FIG. 2.

FIG. 3 illustrates an exemplary implementation of the threshold region including three banded regions from FIG. 2. The point 50 represents a sampled IQ value that is less than the threshold boundary value 30. As such, the sampled IQ value 50 is to revalued to a scaled IQ value. The sampled IQ value 50 includes an I-component and a Q-component, represented as point (a,b) and vector 58. The sampled IQ value 50 is positioned within the banded region 40. The scaling factor g is associated with the banded region 40. Therefore, the scaling factor g is applied to the sampled IQ value 50, thereby forming the scaled IQ value 54. The scaled IQ value 54 is represented as point (a×g, b×g), since the I-component and the Q-component of the sampled IQ value 50 are each multiplied by the scaling factor g. The scaled IQ value 54 is also represented by the vector 56. Note that the direction of the vector 56 is the same as the direction of the vector 58.

Figure 4:
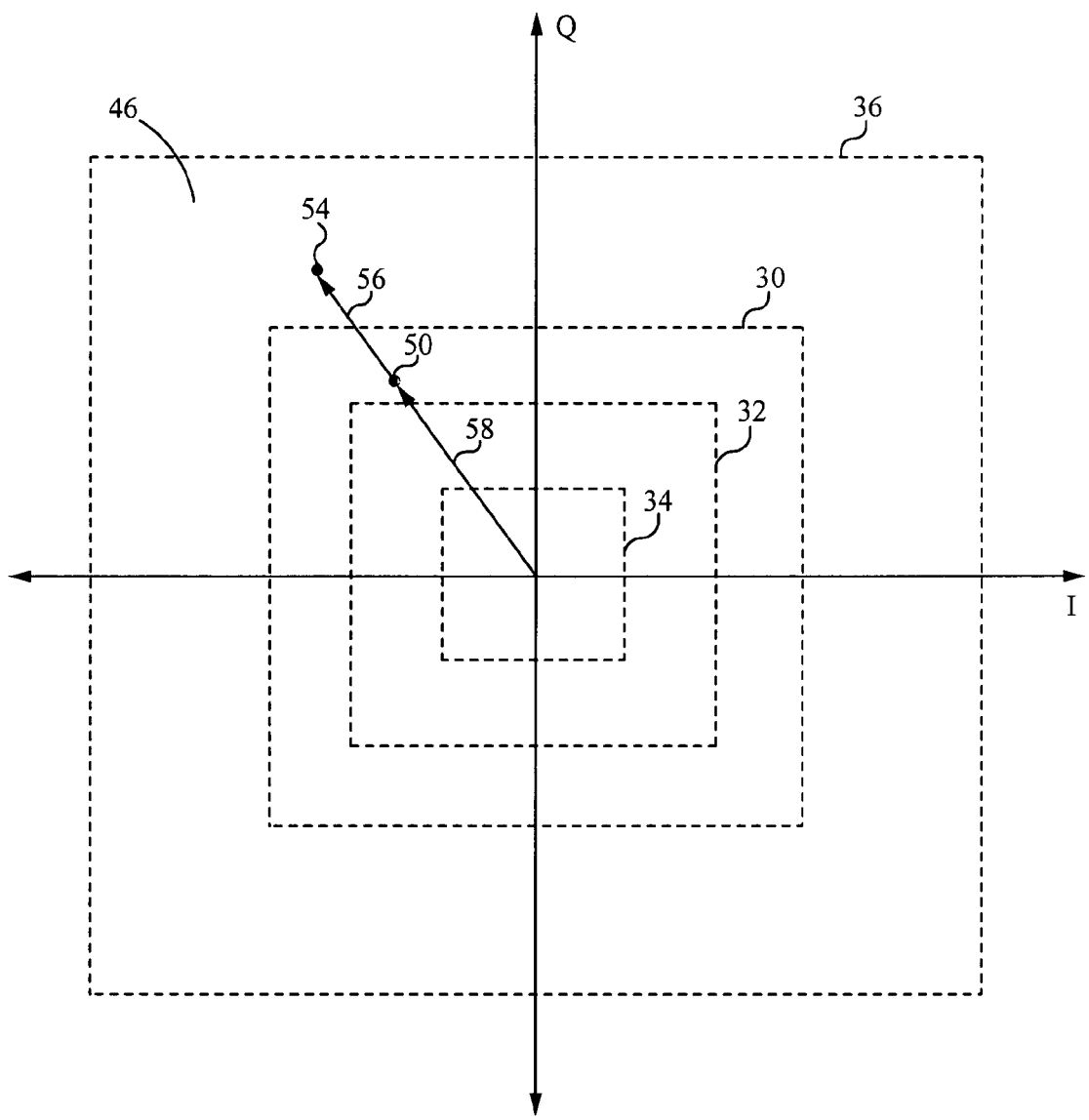
FIG. 4 illustrates the implementation of FIG. 3 including a maximum scaled value.

Each of the boundary values 30, 32, 34 and the scaling factors g, g', g" are configured such that all scaled IQ values are less than a maximum scaled value. FIG. 4 illustrates the implementation of FIG. 3 including a maximum scaled value. A scaled region 46 is bounded by the maximum scaled value 36 and the threshold boundary value 30. All scaled IQ values are greater than or equal to the threshold boundary value 30 and less than the maximum scaled value 36. In the configuration where the sub-threshold boundary values and the threshold boundary value are related by powers of two, the maximum scaled value is also related by a power of two. If the threshold boundary value 30 is represented by four units, then the maximum scaled value 36 is represented by eight units.

Figure 5:
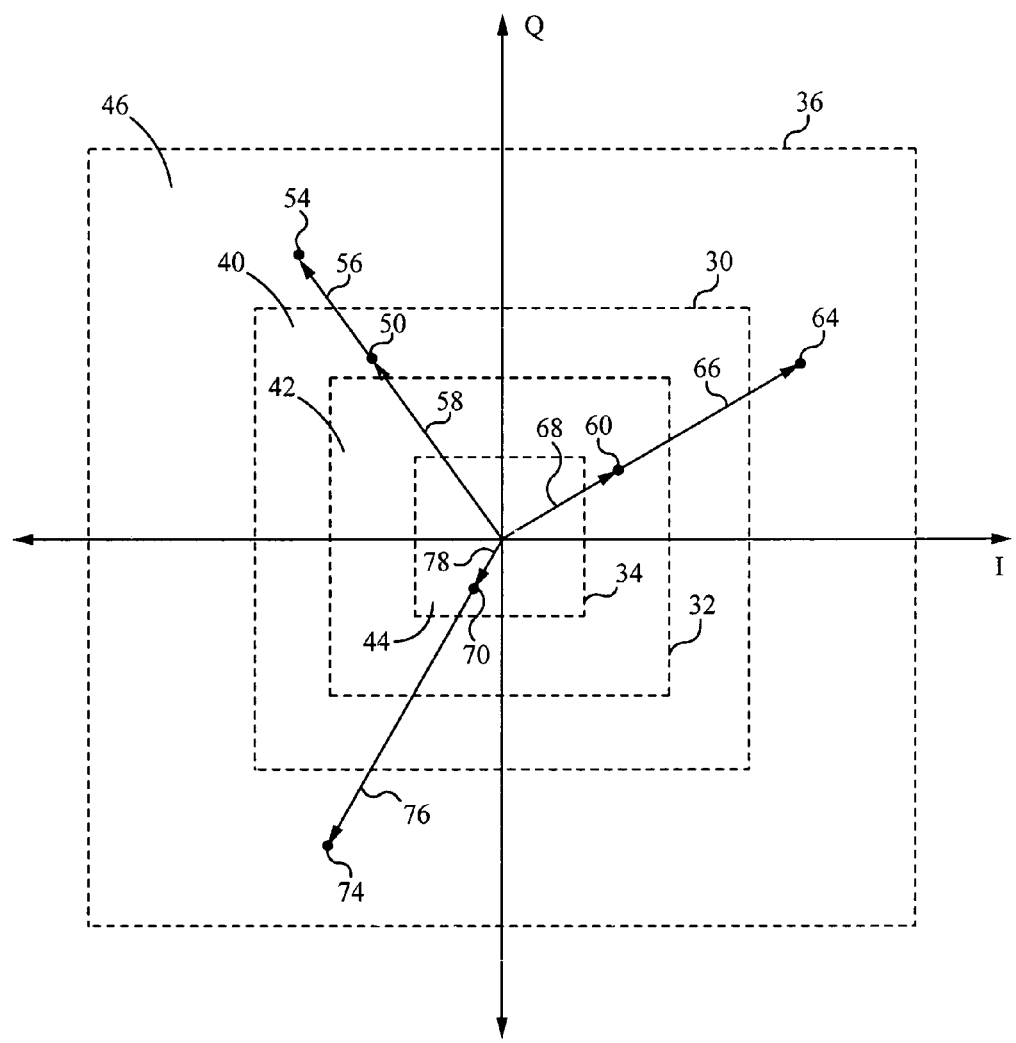
FIG. 5 further illustrates the exemplary implementation of FIG. 4.

The scaling methodology described above in relation to the sampled IQ value 50 and the corresponding scaled IQ value 54 is similarly implemented in each of the other banded regions 42, 44 (FIG. 2). FIG. 5 furthers the exemplary implementation of FIG. 4. The point 60 represents a sampled IQ value with vector 68. The sampled IQ value 60 has a value that is less than the sub-threshold boundary value 32 but greater than the sub-threshold boundary value 34. As such the sampled IQ value 60 is positioned within the banded region 42. The scaling factor g' is associated with the banded region 42. Therefore, the scaling factor g' is applied to the sampled IQ value 60, thereby forming the scaled IQ value 64. The I-component and the Q-component of the sampled IQ value 60 are each multiplied by the scaling factor g'. The scaled IQ value 64 is also represented by the vector 66. Note that the direction of the vector 66 is the same as the direction of the vector 68.

Similarly, the point 70 represents a sampled IQ value with vector 78. The sampled IQ value 70 has a value that is less than the sub-threshold boundary value 34. As such the sampled IQ value 70 is positioned within the banded region 44. The scaling factor g" is associated with the banded region 44. Therefore, the scaling factor g" is applied to the sampled IQ value 70, thereby forming the scaled IQ value 74. The I-component and the Q-component of the sampled IQ value 70 are each multiplied by the scaling factor g". The scaled IQ value 74 is also represented by the vector 76. Note that the direction of the vector 76 is the same as the direction of the vector 78. Also note, the both the scaled IQ value 64 and the scaled IQ value 74 are positioned within the scaled region 46.

Figure 6:
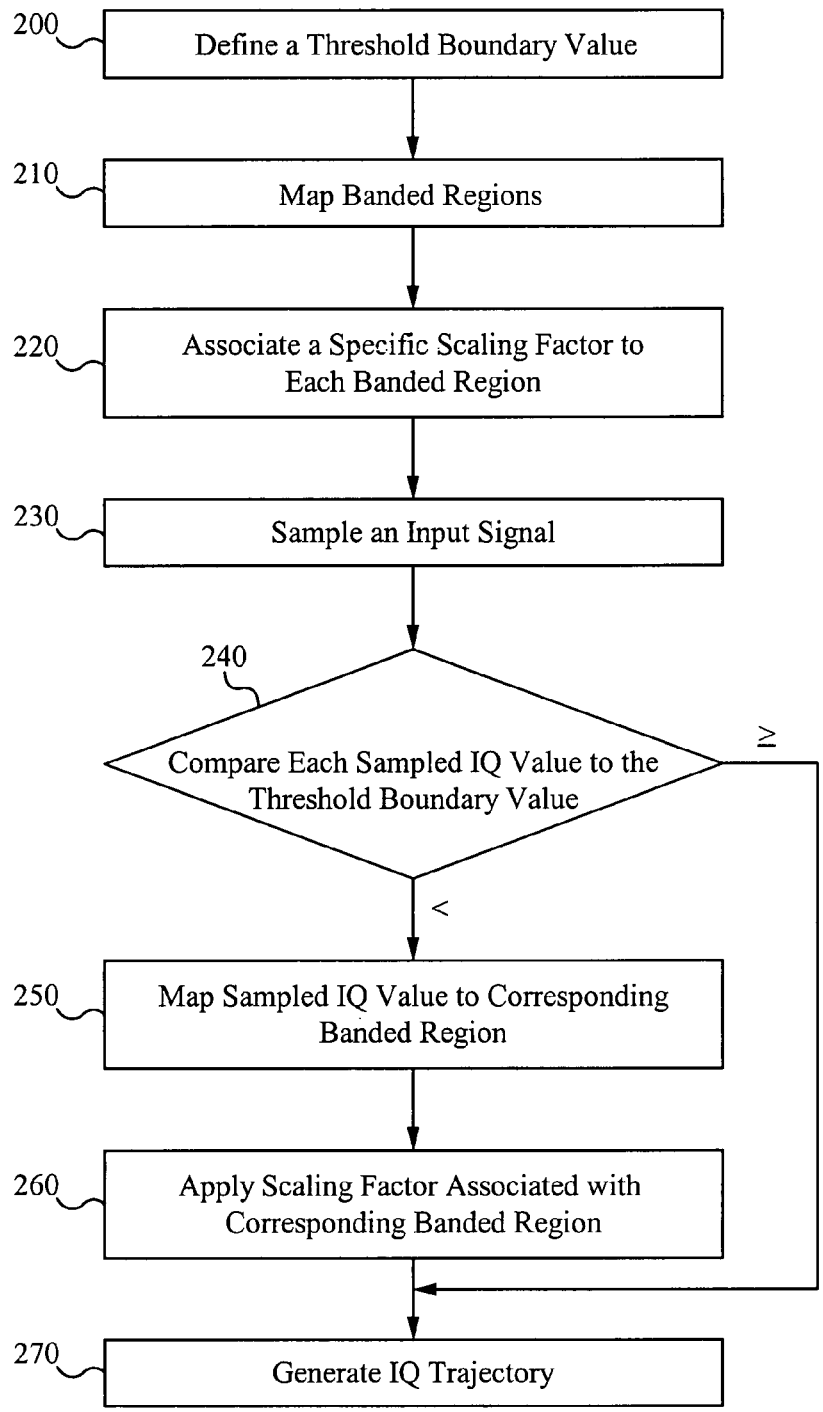
FIG. 6 illustrates the multi-point push-out method for generating an IQ trajectory.

FIG. 6 illustrates the multi-point push-out method for generating an IQ trajectory. At the step 200, a threshold boundary value is defined. The threshold boundary value defines the in-line (I) and quadrature (Q) threshold values. In some embodiments, the I threshold value and the Q threshold value are the same. In other embodiments, the I threshold value and the Q threshold value are different. The threshold boundary value, as defined by the I threshold value and the Q threshold value, defines a threshold region centered about the origin of an IQ value plot. The origin is also referred to as a zero IQ value. At the step 210, one or more sub-threshold regions are mapped within the threshold region. Each sub-threshold region is centered about the origin. The threshold region and the sub-threshold regions form a series of adjacently banded regions extending from the origin to the threshold boundary value. At the step 220, a specific scaling factor is associated with each banded region. At the step 230, an input signal is sampled to generate a series of discrete sampled IQ values. At the step 240, each sampled IQ value is compared to the threshold boundary value. If at the step 240 it is determined that the sampled IQ value is less than the threshold boundary value, which is equivalent to the sampled IQ value positioned within the threshold region, then at the step 250, the sampled IQ value is mapped to a corresponding banded region. At the step 260, the scaling factor associated with the corresponding banded region is applied to the sampled IQ value, thereby forming a scaled IQ value. The scaled IQ value is greater than or equal to the threshold boundary value, and the scaled IQ value is less than a maximum scaled value.

If at the step 240 it is determined that the sampled IQ value is equal to or greater than the threshold boundary value, then the sampled IQ value is not scaled. At the step 270, the sampled IQ values that are not scaled at the step 240 and the scaled IQ values from the step 260 are used to generate an IQ trajectory.

Figure 7A:
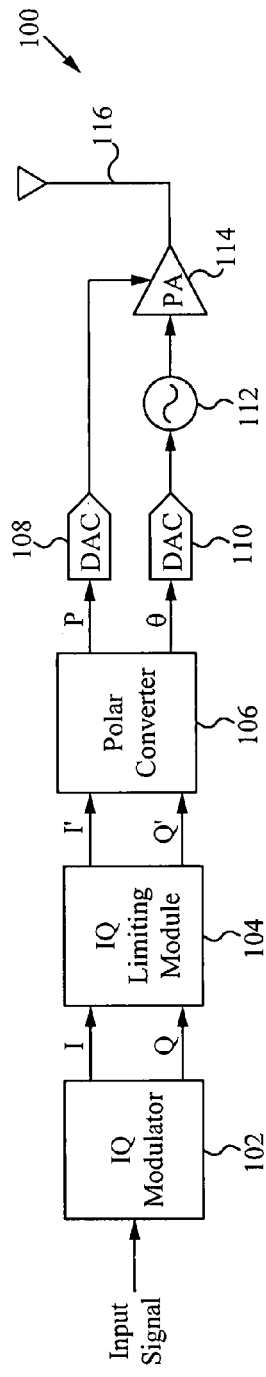
FIGS. 7A, 7B and 7C illustrate block diagrams of exemplary modulation circuits for implementing the multi-point push-out method.

FIG. 7A illustrates a block diagram of an exemplary modulation circuit for implementing the multi-point push-out method. The modulation circuit 100 includes an IQ modulator 102, an IQ limiting module 104, a polar converter 106, a digital-to-analog converter (DAC) 108, a DAC 110, a voltage controlled oscillator (VCO) 112, a power amplifier 114, and an antenna 116. An IQ input signal, including an in-phase (I) component and a quadrature (Q) component, is provided to the IQ modulator 102. The IQ modulator 102 samples the IQ input signal to generate discrete sampled IQ values, which are output to the IQ limiting module 104. The IQ limiting module 104 compares each sampled IQ value to the threshold boundary value. For each sampled IQ value that is less than the threshold boundary value, a specific scaling factor is determined and applied to form a scaled IQ value, as described above. For each sample IQ value that is greater than or equal to the threshold boundary value, a scaling factor is not determined and the sampled IQ value is essentially passed through and output from the IQ limiting module 104. Each passed through sampled IQ value and each scaled IQ value are input to the polar converter 106. The polar converter 106 converts each received IQ value to a corresponding digital amplitude signal and digital phase signal.

Figure 7B:
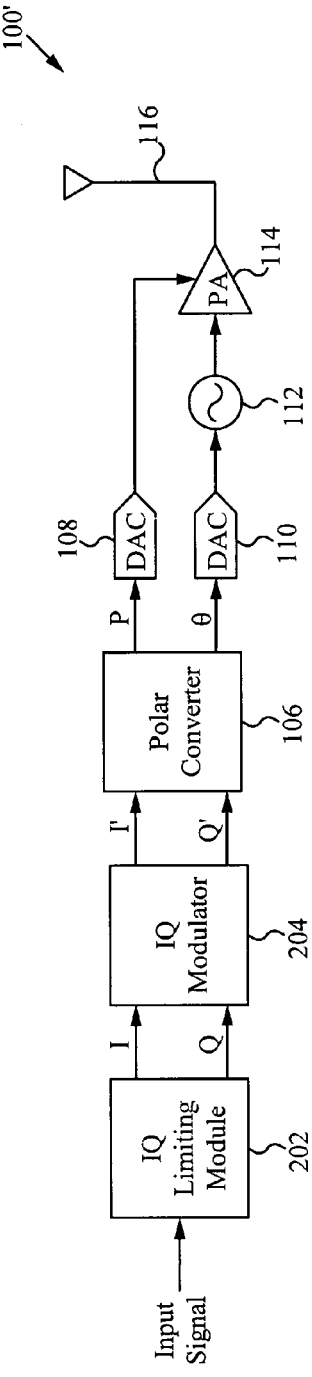

In the exemplary modulation circuit 100' of FIG. 7B, the IQ input signal, including an in-phase (I) component and a quadrature (Q) component, is provided to an IQ limiting module 202. The IQ limiting module 202 first receives the IQ input signal, determines the scaling factor and applies the scaling factor to form a scaled IQ value, if appropriate. The scaled IQ values and passed through values from the IQ limiting module 202 are then output to the IQ modulator 204, which samples these values to generate discrete values, which are then provided to the polar converter 106.

Figure 7C:
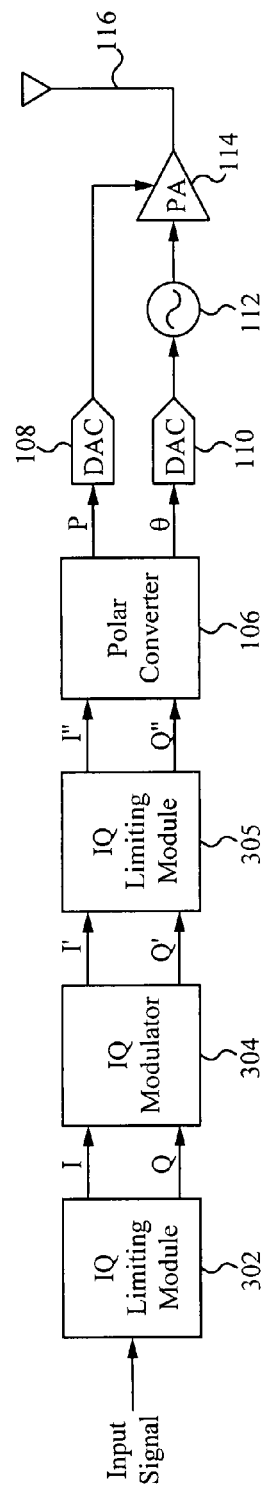

In the exemplary modulation circuit 100" of FIG. 7C, the IQ input signal, including an in-phase (I) component and a quadrature (Q) component, is provided to an IQ limiting module 302. The IQ limiting module 302 first receives the IQ input signal, determines the scaling factor and applies the scaling factor to form a scaled IQ value, if appropriate. The scaled IQ values and passed through values from the IQ limiting module 302 are then output to an IQ modulator 304 which samples these values to generate discrete values. In this embodiment, the output of the IQ modulator 304 is then provided to a second IQ limiting module 305. The output of the second IQ limiting module 305 is then provided to the polar converter 106.

In each of the exemplary modulation circuits of FIGS. 7A, 7B and 7C, the digital amplitude signal received from the polar converter 106 is converted to a corresponding analog amplitude signal by the DAC 108. The digital phase signal received from the polar converter 106 is converted to a corresponding analog phase signal by the DAC 110. The VCO 112 generates a frequency response according to the input analog phase signal. The frequency response output from the VCO 112 and the analog amplitude signal output from the DAC 108 are input to the power amplifier 114. The power amplifier 114 outputs an amplified signal, which is transmitted by the antenna 116. In some embodiments, the amplified signal is a radio frequency (RF) signal.

The IQ trajectory translates in part to the phase response represented by the phase signal output from the polar converter 106. Ideally, the phase response includes smooth transitions. However, when distortion is introduced, such as when the IQ trajectory is near the origin, transients in the phase response are generated, which are manifested as irregular transitions in the phase signal input to the VCO 112. Such irregular transitions negatively impact the performance of the VCO 112, and therefore negatively impact the analog signal output from the modulation circuit 100. The scaled IQ values resulting from revaluing the sampled IQ values near the origin server to reduce such irregular transitions in the phase response, thereby improving the performance of the VCO and the output analog signal.

In addition to providing an improved phase response, generating the scaled IQ value as described above results in reducing the dynamic range of the power amplifier. Reducing the dynamic range is often a desired design consideration.

Each of the boundary values is described above as a square. It is understood that the boundary values can take other shapes, such as a circle. It is also understood that it is not required that all of the boundary values take the same shape. For example, the threshold boundary value can be defined by a square and one or more of the sub-threshold boundary values can be defined by a circle.

The present application has been described in terms of specific embodiments incorporating details to facilitate the understanding of the principles of construction and operation of the power amplification circuit. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

What is claimed is:

1. A method comprising:
   a. generating a plurality of discrete sampled IQ values based on an input signal, wherein each sampled IQ value includes an in-phase component and a quadrature component;
   b. comparing each sampled IQ value to a defined minimum IQ value;
   c. for each specific sampled IQ value that is less than the minimum IQ value, determining a specific scaling factor to be applied to the specific sampled IQ value, wherein the specific scaling factor is determined according to a relative difference between the specific sampled IQ value and the minimum IQ value; and
   d. applying the specific IQ scaling factor to the specific sampled IQ value, thereby generating a scaled IQ value, wherein the scaled IQ value exceeds the minimum IQ value, further wherein the specific IQ scaling factor is applied to the in-phase component and the quadrature component of the specific sampled IQ value, wherein the determined scaling factor is selected from a set of scaling factors, wherein each scaling factor in the set of scaling factors is associated with a range of distances from the minimum IQ value.

2. The method of claim 1 wherein each scaling factor is related to another scaling factor in the set by a power of two.

3. The method of claim 1 further comprising generating an IQ trajectory according to each scaled IQ value and each sampled IQ value that is equal to or greater than the minimum IQ value.

4. The method of claim 1 wherein the input signal is sampled at an over-sampling rate.

5. The method of claim 1 wherein the input signal is sampled at data rate.

6. A method comprising:
   a. defining a threshold boundary value centered about a zero IQ value, thereby forming a threshold region;
   b. mapping one or more sub-threshold regions within the threshold region, each sub-threshold region is centered about the zero IQ value thereby forming a plurality of adjacent banded regions extending from the zero IQ value to the threshold boundary value, wherein each banded region is associated with a specific scaling factor;
   c. generating a plurality of discrete sampled IQ values based on an input signal;
   d. comparing each sampled IQ value to the threshold boundary value;
   e. for each sampled value that is less than the threshold boundary value, mapping the sampled IQ value to a corresponding banded region; and
   f. multiplying the sampled IQ value by the specific scaling factor associated with the corresponding banded region, thereby forming a scaled IQ value, wherein each sub-threshold region is defined by a sub-threshold value, and each sub-threshold value and the threshold boundary value are related by a power of two.

7. The method of claim 6 wherein each scaled IQ value is equal to or greater than the threshold boundary value and less than a maximum scaled value.

8. The method of claim 6 wherein a first scaling factor associated with a first banded region is less than a second scaling factor associated with a second banded region if the first banded region is further away from the zero IQ value than the second banded region.

9. The method of claim 6 wherein the threshold region forms a square region centered about the zero IQ value.

10. The method of claim 9 wherein each sub-threshold region forms a square region centered about the zero IQ value.

11. The method of claim 6 further comprising generating an IQ trajectory according to each scaled IQ value and each sampled IQ value that is equal to or greater than the threshold boundary value.

12. The method of claim 6 wherein the input signal is sampled at an over-sampling rate.

13. The method of claim 6 wherein the input signal is sampled at data rate.

14. A machine comprising an IQ limiting module configured to compare a sampled IQ value based on an input signal, to a defined minimum IQ value, to determine a specific scaling factor to be applied to the specific sampled IQ value for each specific sampled IQ value that is less than the minimum IQ value, wherein the specific scaling factor is determined according to a relative difference between the specific sampled IQ value and the minimum IQ value, and to apply the specific IQ scaling factor to the specific sampled IQ value, thereby generating a scaled IQ value, wherein the scaled IQ value exceeds the minimum IQ value, further wherein the specific IQ scaling factor is applied to the inphase component and the quadrature component of the specific sampled IQ value, wherein the IQ limiting module is configured to select the scaling factor from a set of scaling factors, wherein each scaling factor in the set of scaling factors is associated with a range of distances from the minimum IQ value.

15. The machine of claim 14 wherein each scaling factor is related to another scaling factor in the set by a power of two.

16. The machine of claim 14 wherein the IQ limiting module is further configured to generate an IQ trajectory according to each scaled IQ value and each sampled IQ value that is equal to or greater than the minimum IQ value.

17. The machine of claim 14 wherein the IQ modulator is configured to sample the input signal at an over-sampling rate.

18. A method comprising:
  a. generating a plurality of discrete sampled IQ values based on an input signal, wherein each sampled IQ value includes an in-phase component and a quadrature component;
  b. comparing each sampled IQ value to a defined minimum IQ value;
  c. for each specific sampled IQ value that is less than the minimum IQ value, determining a specific scaling factor to be applied to the specific sampled IQ value, wherein the specific scaling factor is determined according to a relative difference between the specific sampled IQ value and the minimum IQ value;
  d. applying the specific IQ scaling factor to the specific sampled IQ value, thereby generating a scaled IQ value, wherein the scaled IQ value exceeds the minimum IQ value, further wherein the specific IQ scaling factor is applied to the in-phase component and the quadrature component of the specific sampled IQ value; and
  e. generating an IQ trajectory according to each scaled IQ value and each sampled IQ value that is equal to or greater than the minimum IQ value.

19. A method comprising:
  a. defining a threshold boundary value centered about a zero IQ value, thereby forming a threshold region;
  b. mapping one or more sub-threshold regions within the threshold region, each sub-threshold region is centered about the zero IQ value thereby forming a plurality of adjacent banded regions extending from the zero IQ value to the threshold boundary value, wherein each banded region is associated with a specific scaling factor;
  c. generating a plurality of discrete sampled IQ values based on an input signal;
  d. comparing each sampled IQ value to the threshold boundary value;
  e. for each sampled value that is less than the threshold boundary value, mapping the sampled IQ value to a corresponding banded region; and
  f. multiplying the sampled IQ value by the specific scaling factor associated with the corresponding banded region, thereby forming a scaled IQ value,
    wherein a first scaling factor associated with a first banded region is less than a second scaling factor associated with a second banded region if the first banded region is further away from the zero IQ value than the second banded region.

20. A method comprising:
  a. defining a threshold boundary value centered about a zero IQ value, thereby forming a threshold region;
  b. mapping one or more sub-threshold regions within the threshold region, each sub-threshold region is centered about the zero IQ value thereby forming a plurality of adjacent banded regions extending from the zero IQ value to the threshold boundary value, wherein each banded region is associated with a specific scaling factor;
  c. generating a plurality of discrete sampled IQ values based on an input signal;
  d. comparing each sampled IQ value to the threshold boundary value;
  e. for each sampled value that is less than the threshold boundary value, mapping the sampled IQ value to a corresponding banded region;
  f. multiplying the sampled IQ value by the specific scaling factor associated with the corresponding banded region, thereby forming a scaled IQ value; and
  g. generating an IQ trajectory according to each scaled IQ value and each sampled IQ value that is equal to or greater than the threshold boundary value.

21. A machine comprising an IQ limiting module configured,
  to compare a sampled IQ value based on an input signal, to a defined minimum IQ value, to determine a specific scaling factor to be applied to the specific sampled IQ value for each specific sampled IQ value that is less than the minimum IQ value, wherein the specific scaling factor is determined according to a relative difference between the specific sampled IQ value and the minimum IQ value,
  to apply the specific IQ scaling factor to the specific sampled IQ value, thereby generating a scaled IQ value, wherein the scaled IQ value exceeds the minimum IQ value and the specific IQ scaling factor is applied to an inphase compound and a quadrature component of the specific sampled IQ value, and
  to generate an IQ trajectory according to each scaled IQ value and each sampled IQ value that is equal to or greater than the minimum IQ value.

* * * * *